US011235346B1

(12) United States Patent
Ishida et al.

(10) Patent No.: US 11,235,346 B1
(45) Date of Patent: Feb. 1, 2022

(54) PAINTING FACILITY

(71) Applicant: Taikisha Ltd., Tokyo (JP)

(72) Inventors: Kozo Ishida, Tokyo (JP); Toshihiko Koike, Tokyo (JP); Hisao Nakajima, Tokyo (JP); Tomotaka Miwa, Tokyo (JP); Hiroshi Iwakiri, Tokyo (JP)

(73) Assignee: Taikisha Ltd., Tokyo (JP)

( * ) Notice: Subject to any disclaimer, the term of this patent is extended or adjusted under 35 U.S.C. 154(b) by 0 days.

(21) Appl. No.: 17/268,280

(22) PCT Filed: Aug. 27, 2020

(86) PCT No.: PCT/JP2020/032316
§ 371 (c)(1),
(2) Date: Feb. 12, 2021

(51) Int. Cl.
*B01D 46/00* (2006.01)
*B01D 46/42* (2006.01)
*B05B 16/60* (2018.01)

(52) U.S. Cl.
CPC .......... *B05B 16/60* (2018.02); *B01D 46/0005* (2013.01); *B01D 46/4227* (2013.01); *B01D 2265/02* (2013.01); *B01D 2271/02* (2013.01); *B01D 2275/205* (2013.01); *B01D 2279/35* (2013.01)

(58) Field of Classification Search
CPC ............... B05B 16/60; B01D 46/0005; B01D 46/4227; B01D 2271/02; B01D 2265/02; B01D 2275/205; B01D 2279/35; B01D 46/0002; B01D 46/0013; B01D 46/002; B01D 46/0023; B01D 46/0093
USPC ...... 55/356, 385.1, DIG. 46; 95/273; 96/407
See application file for complete search history.

(56) References Cited

U.S. PATENT DOCUMENTS

| 5,591,240 A | * | 1/1997 | Ophardt ............. B01D 46/0058 96/407 |
| 5,851,248 A | | 12/1998 | Wilson et al. |
| 8,535,420 B2 | * | 9/2013 | Holler ................ B01D 46/0002 95/273 |
| 9,321,070 B2 | * | 4/2016 | Link ....................... B05B 14/43 |
| 10,646,891 B2 | * | 5/2020 | Zebisch .................. B05B 16/40 |
| 2010/0197213 A1 | | 8/2010 | Holzheimer et al. |

(Continued)

FOREIGN PATENT DOCUMENTS

| JP | H7185421 A | 7/1995 |
| JP | 200540682 A | 2/2005 |
| JP | 2010188258 A | 9/2010 |

(Continued)

*Primary Examiner* — Minh Chau T Pham
(74) *Attorney, Agent, or Firm* — The Webb Law Firm

(57) ABSTRACT

The facility includes a first connection mechanism connecting a filter unit to a floor discharging section to establish communication between an opening portion of the floor discharging section and an upper face opening portion of the filter unit and a second connection mechanism connecting the filter unit to an exhausting chamber to establish communication between an opening portion of the exhausting chamber and a side face opening portion of the filter unit. The first connection mechanism includes a seal portion that comes into contact with an entire circumference of an outer face of an upper end portion of the filter unit, thus preventing leakage of exhaust gas. The seal portion includes an introducing portion for introducing the upper end portion of the filter unit to the seal portion from a horizontal direction.

20 Claims, 8 Drawing Sheets

(56) References Cited

U.S. PATENT DOCUMENTS

2014/0202332 A1    7/2014  Link et al.
2018/0243778 A1    8/2018  Covizzi et al.

FOREIGN PATENT DOCUMENTS

| JP | 2010536545 A | 12/2010 |
| JP | 2014527462 A | 10/2014 |
| JP | 2018531778 A | 11/2018 |

* cited by examiner

PAINTING FACILITY

CROSS-REFERENCE TO RELATED APPLICATION

This application is the United States national phase of International Application No. PCT/JP2020/032316 filed Aug. 27, 2020, the disclosure of which is hereby incorporated by reference in its entirety.

BACKGROUND OF THE INVENTION

Field of the Invention

The present invention relates to a painting facility including a painting chamber where a spray painting (coating) work is done on a painting subject, an exhausting chamber where exhaust gas from the painting chamber is drawn in via a floor discharging section of the painting chamber and a filter unit configured to collect uncoated (unused) paint mist contained in the exhaust gas.

Description of Related Art

As a filter unit used in a painting facility and configured to collect uncoated (unused) paint mist, as disclosed in Japanese Unexamined Patent Application Publication No. 2014-527462 (Patent Document 1) for example, there is known a filter unit having a filter member constituted of a paper material such as a cardboard material, corrugated paper material, etc.
Patent Document 1: Japanese Unexamined Patent Application Publication No. 2014-527462

SUMMARY OF THE INVENTION

The painting facility of Patent Document 1 is configured such that sealability is ensured by pressing an end face of the filter member formed of paper material against an intermediate passage. For this reason, with lapse of a certain period, there occurs embrittlement of the paper-made filter member, thus becoming unable to maintain the sealability. Consequently, a gap may be formed to invite risk of exhaust gas leakage.

The present invention has been made in view of the above-described state of the art and its principal object is to provide a painting facility that can ensure sealability without aging embrittlement of a paper-made filter member even in case a filter unit having such paper-made filter member is employed.

According to a characterizing feature of a painting facility relating to the present invention, the painting facility comprises:

a painting chamber where a spray painting (coating) work is done on a painting subject;

an exhausting chamber where exhaust gas from the painting chamber is drawn in via a floor discharging section of the painting chamber; and a filter unit configured to collect uncoated (unused) paint mist contained in the exhaust gas;

wherein the painting facility further comprises a first connection mechanism connecting the filter unit to the floor discharging section to establish communication between an opening portion of the floor discharging section and an upper face opening portion of the filter unit and a second connection mechanism connecting the filter unit to the exhausting chamber to establish communication between an opening portion of the exhausting chamber and a side face opening portion of the filter unit;

wherein the first connection mechanism includes a seal portion that comes into contact with an entire circumference of an outer face of an upper end portion of the filter unit, thus preventing leakage of the exhaust gas; and wherein the seal portion includes an introducing portion for introducing the upper end portion of the filter unit to the seal portion from a horizontal direction.

With the above-described configuration, as the upper end portion of the filter unit is introduced in the horizontal direction via the introducing portion to the seal portion that prevents leakage of exhaust gas so that the filter unit has its side face sealed. Accordingly, there is no need to ensure the sealability by pressing the end face of the paper-made filter member as is done in the conventional painting facility. Therefore, even if the filter unit employs a paper-made filter member, there occurs no aging embrittlement of this filter member to become unable to maintain the sealability and there is no risk of exhaust gas leakage, either.

In the painting facility relating to the present invention, preferably, at the introducing portion, there is provided a partial seal portion which is openable/closable or detachable.

With provision of the openable/closable or detachable partial seal portion at the introducing portion, the upper end portion of the filter unit can be introduced to the seal portion easily; and also with the partial seal portion, the upper end portion of the filter unit can be sealed in a more reliable manner.

In the painting facility relating to the present invention, preferably:

the seal portion has a planar shape which comprises a trapezoidal shape whose width increases progressively toward the side of the introducing portion; and the outer face of the upper end portion of the filter unit has a planar shape which comprises a trapezoidal shape in substantial agreement with the planar shape of the seal portion, so that upon introduction of the upper end portion of the filter unit to the seal portion in the horizontal direction, the outer face of the upper end portion of the filter unit is fitted to an inner side of the seal portion.

With the above-described configuration, at the upper end portion of the filter unit, its lateral width on the side of introducing the seal portion is greater than its lateral width on the side of initial introduction, so that fine position alignment is not needed and it becomes easier to introduce the upper end portion of the filter unit to the seal portion of the first connection mechanism.

In the painting facility relating to the present invention, preferably, the width of the introducing portion of the seal portion is variable.

If the width of the introducing portion of the seal portion is variable as provided in the above-described arrangement, the introduction of the upper end portion of the filter unit to the seal portion becomes even easier.

In the painting facility relating to the present invention, preferably, the first connection mechanism includes a guide member for guiding movement of the filter unit.

With the above-described arrangement, as the filter unit is guided by the guide member, it becomes possible to dispose the filter unit at a predetermined position in a more reliable manner.

In the painting facility relating to the present invention, preferably, an end portion of the guide member is bent toward the outer side of a movement path of the filter unit.

If the end portion of the guide member is bent toward the outer side of the movement path of the filter unit as provided in the above-described arrangement, the filter unit can be pushed in easily along a guide rail without requiring fine position alignment.

In the painting facility relating to the present invention, preferably, the filter unit includes a roller member which rotates in contact with the guide member.

As the roller member of the filter unit rotates in contact with the guide member as provided in the above-described arrangement, the filter unit can be moved more smoothly.

In the painting facility relating to the present invention, preferably, the second connection mechanism includes a coupling member for connecting the exhausting chamber with the filter unit, the coupling member being remotely operable.

With the above-described arrangement, the exhausting chamber and the filter unit can be connected to each other in a more reliable manner via the coupling member, and also with a remote operation of the coupling member at the time of setting of the filter unit in the painting facility, this setting operation can be implemented more easily.

DETAILED DESCRIPTION OF THE INVENTION

Next, an embodiment of a painting facility relating to the present invention will be explained with reference to the accompanying drawings.

Figure 1:
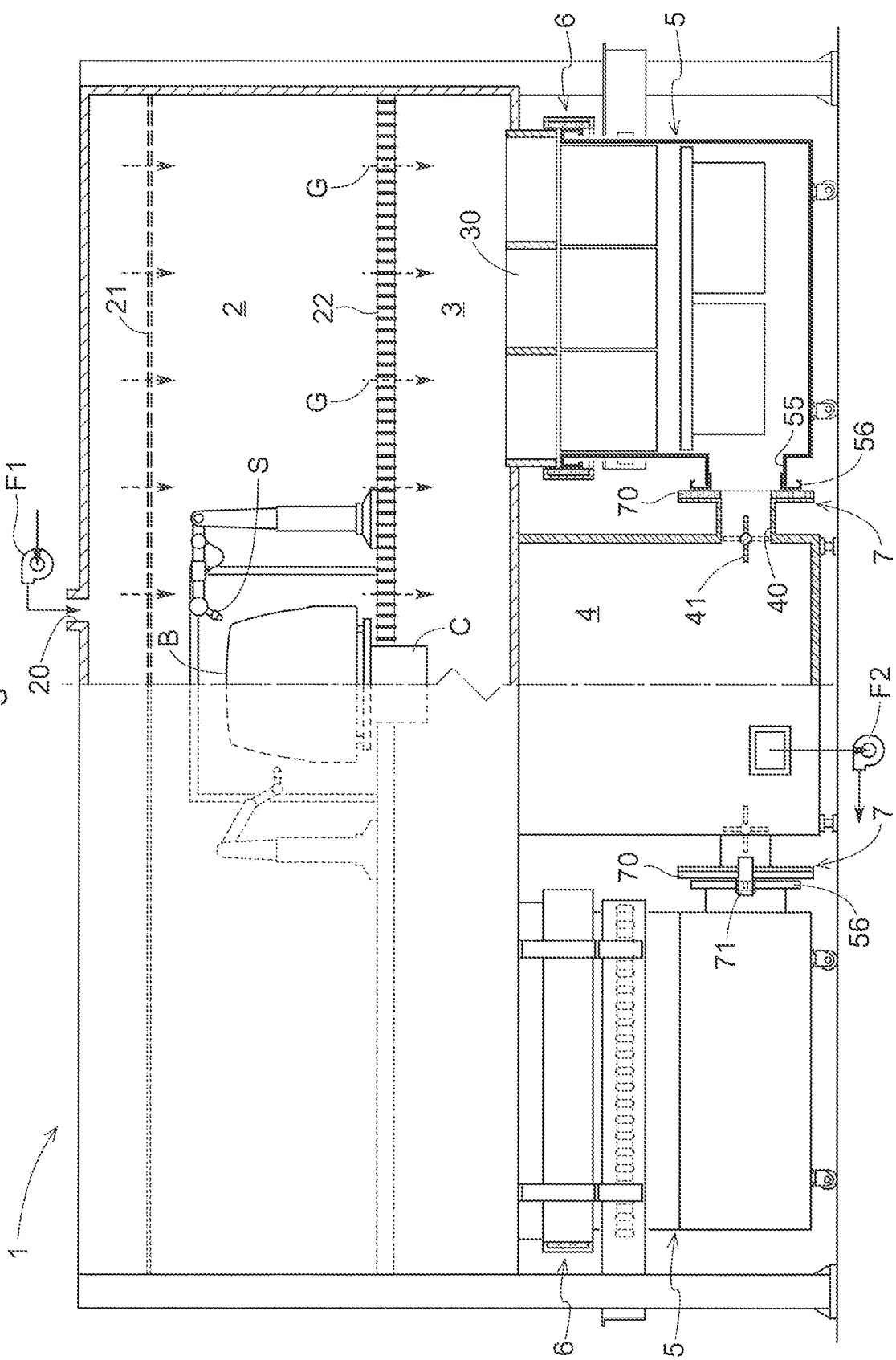
FIG. 1 is a front face schematic configuration diagram of a painting facility relating to the present invention.

As shown in FIG. 1, a painting facility 1 includes a painting chamber 2 where a spray paining (coating) work is done on a body B of an automobile as an example of a "painting subject", an exhausting chamber 4 where exhaust gas G from the painting chamber 2 is drawn in via a floor discharging section 3, and a pair of left and right filter units 5 configured to entrap or collect uncoated (or unused) paint mist contained in the exhaust gas G.

The pair of left and right filter units 5 are disposed in opposition across the exhausting chamber 4 therebetween downwardly of the floor discharging section 3. Incidentally, the left and right sides as used herein refer to the left and right sides in the plane of illustration in FIG. 1.

In this embodiment, the filter units 5 of an identical construction are provided in opposition in left/right reversal layout across the exhausting chamber 4. Thus, in case no discrimination between the left side and the right side is needed, reference will be made to only one of the pair of left and right filter units 5, reference or explanation of the other one being omitted.

The painting chamber 2 includes a conveyer mechanism C for carrying in/out the body B to/from this painting chamber 2, a spraying device S for spraying, from the surrounding, predetermined paint onto the body B carried in by the conveyer mechanism C, and so on.

A ceiling face of the painting chamber 2 includes an air inlet 20. On the upstream side of the air inlet 20, a blower fan F1 is provided, so that an arrangement is made such that fresh air fed via the air inlet 20 may be dust-removed by a dustproof filter 21 and then fed to the inside of the painting chamber 2.

A work floor 22 of the painting chamber 2 is configured to allow air communication. Under this work floor 22, a floor discharging section 3 is provided and a bottom face of the floor discharging section 3 defines a discharging opening portion 30. The height of the floor discharging section 3 is set at such a level that allows avoidance of interference between a rail or the like included in the conveyer mechanism C and the filter unit 5.

Under the discharging opening portion 30 of the floor discharging section 3, a first connection mechanism 6 for connecting the floor discharging section 3 with the filter unit 5 is provided in such a manner as to surround the circumferential edge of the discharging opening portion 30. Via this first connection mechanism 6, communication is established between the discharging opening portion 30 of the floor discharging section 3 and an upper face opening portion 51 of the filter unit 5.

An exhausting opening portion 40 is provided in a side face of the exhausting chamber 4. On the outer side of the side face of the exhausting chamber 4, a second connection mechanism 7 for connecting the exhausting chamber 4 with the filter unit 5 is provided in such a manner as to surround the circumferential edge of the exhausting opening portion 40. Via this second connection mechanism 7, communication is established between the exhausting opening portion 40 of the exhausting chamber 4 and a side face opening portion 55 of the filter unit 5.

On the downstream side of the exhausting chamber 4, there is provided a suction fan F2. As this suction fan F2 is driven, air containing uncoated (i.e. unused) paint mist in the painting chamber 2 will be drawn in as an exhaust gas G to the floor discharging section 3 via the work floor 22 and then introduced via the discharging opening portion 30 of the floor discharging section 3 to the upper face opening portion 51 of the filter unit 5.

Subsequently, the exhaust gas G introduced to the filter unit 5 will have its uncoated paint mist separated and removed by the filter unit 5 and then will be discharged via the side face opening portion 55 of the filter unit 5 to arrive at the exhausting chamber 4 via the exhausting opening portion 40 of the exhausting chamber 4 and then discharged eventually from there to the outside of the facility.

The exhausting opening portion 40 includes a flow rate adjusting damper 41. In operation, with adjustment of flow rate of air flowing in the respective paths by this flow rate adjusting damper 41, it is possible to adjust the air passage flow rate of each filter unit 5 which will be reduced in accordance with development of a clogging situation of the filter member.

For the exhaust gas G, an arrangement is made such that after the gas G is introduced in a direction substantially perpendicular to the filter unit 5 via the upper face opening portion 51 of the filter unit 5 (see FIG. 2, FIG. 4), this exhaust gas G may be discharged in a substantially horizontal direction via the side face opening portion 55 of the filter unit 5. Namely, in the filter unit 5, there is formed an L-shaped passage through which the exhaust gas G moves.

Figure 4:
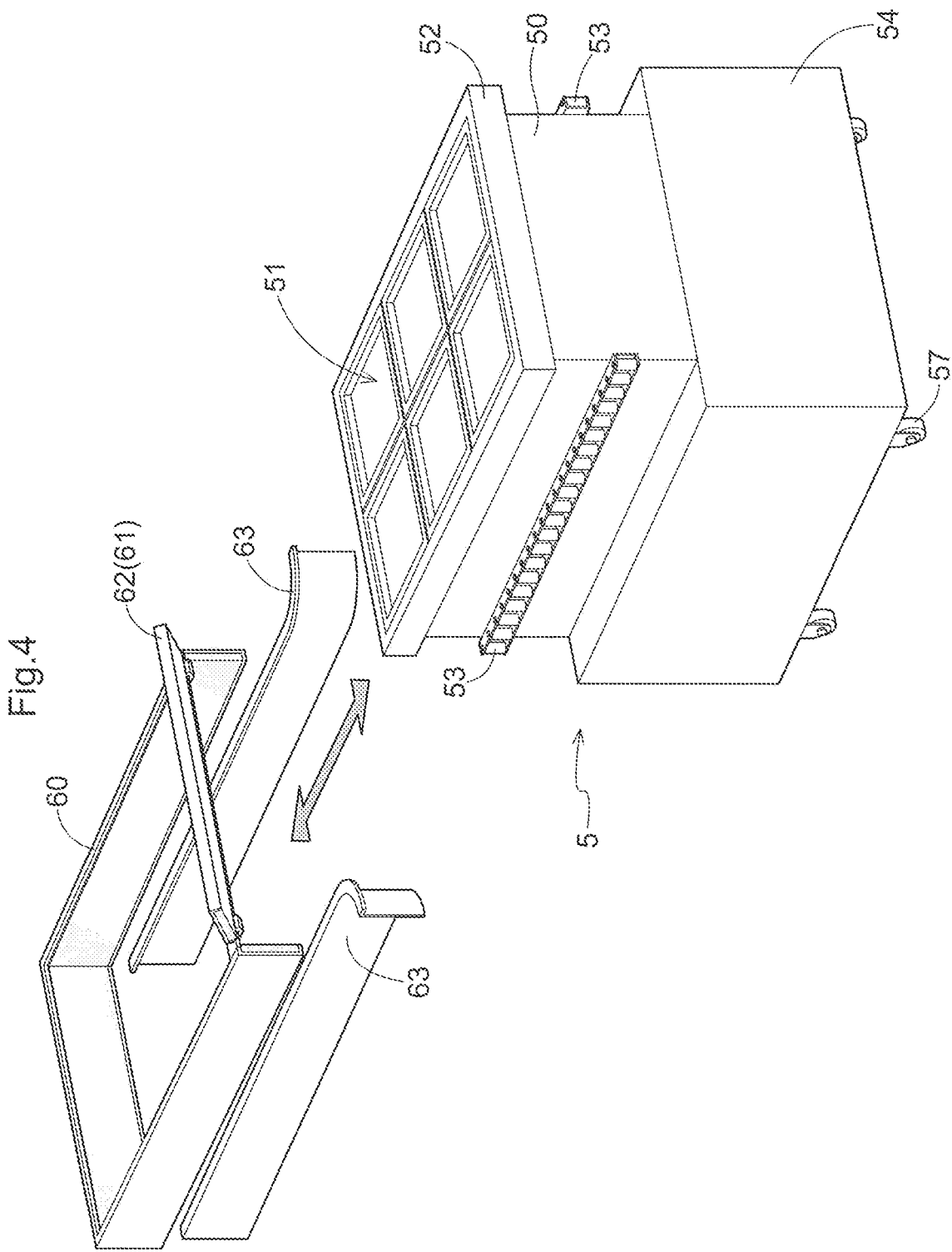
FIG. 4 is a perspective view showing the first connection mechanism and the filter unit prior to setting of the filter unit.
Figure 5:
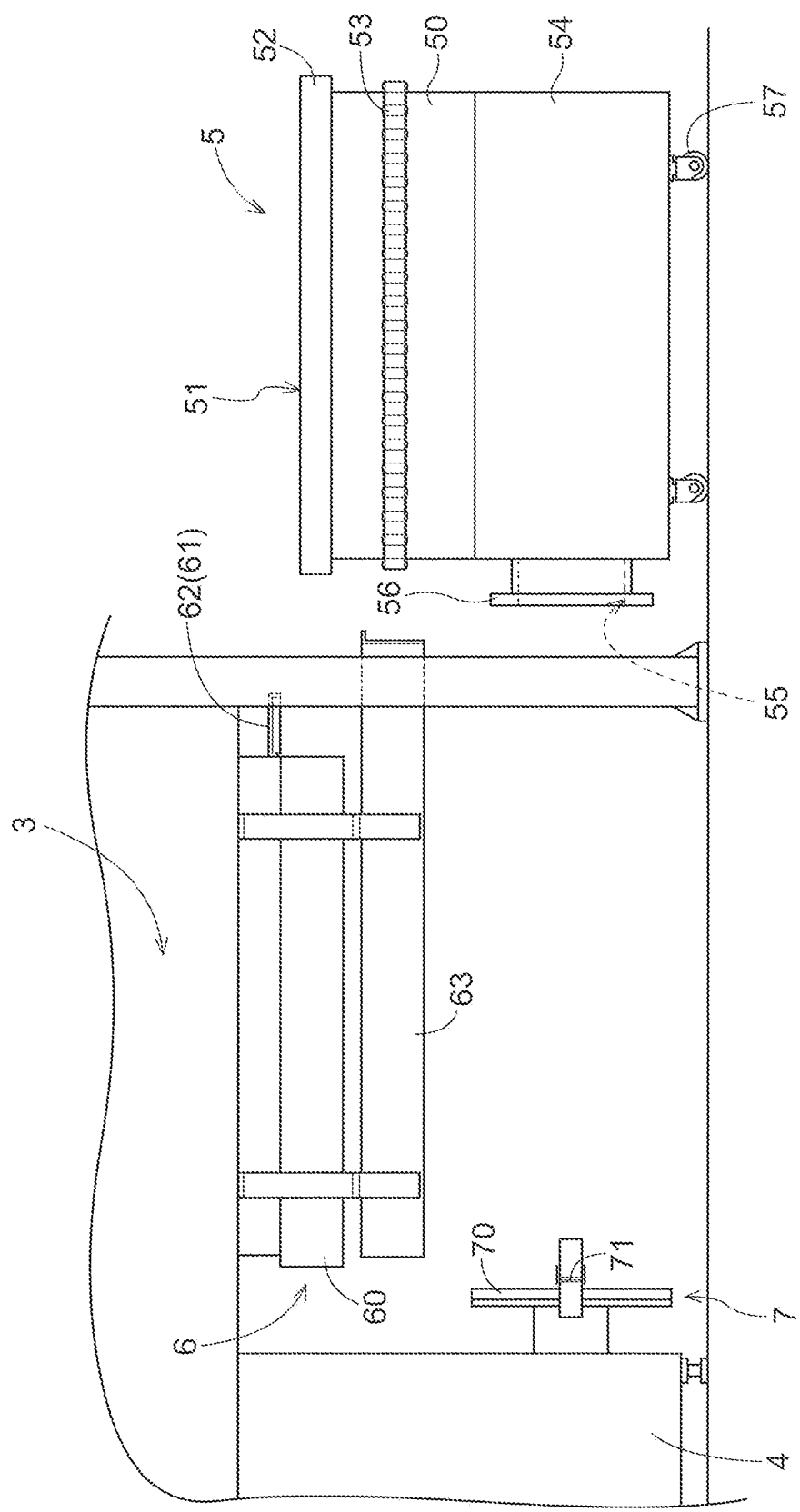
FIG. 5 is a side view showing the first connection mechanism and the filter unit prior to setting of the filter unit.

As shown in FIG. 4 and FIG. 5, the filter unit 5 has a box-shaped housing with an approximately rectangular cross sectional shape having an upper housing 50 and a lower housing 54.

Though not shown, inside the upper housing 50, there is provided a mist separator made of paper material and having a passage and provided by appropriately bending a sheet of cardboard or a craft paper. Inside the lower housing 54, there are provided an intermediate-performance filter made of nonwoven fabric or the like having an uncoated paint mist collecting performance higher than that of the paper-made mist separator, etc.

Figure 2:
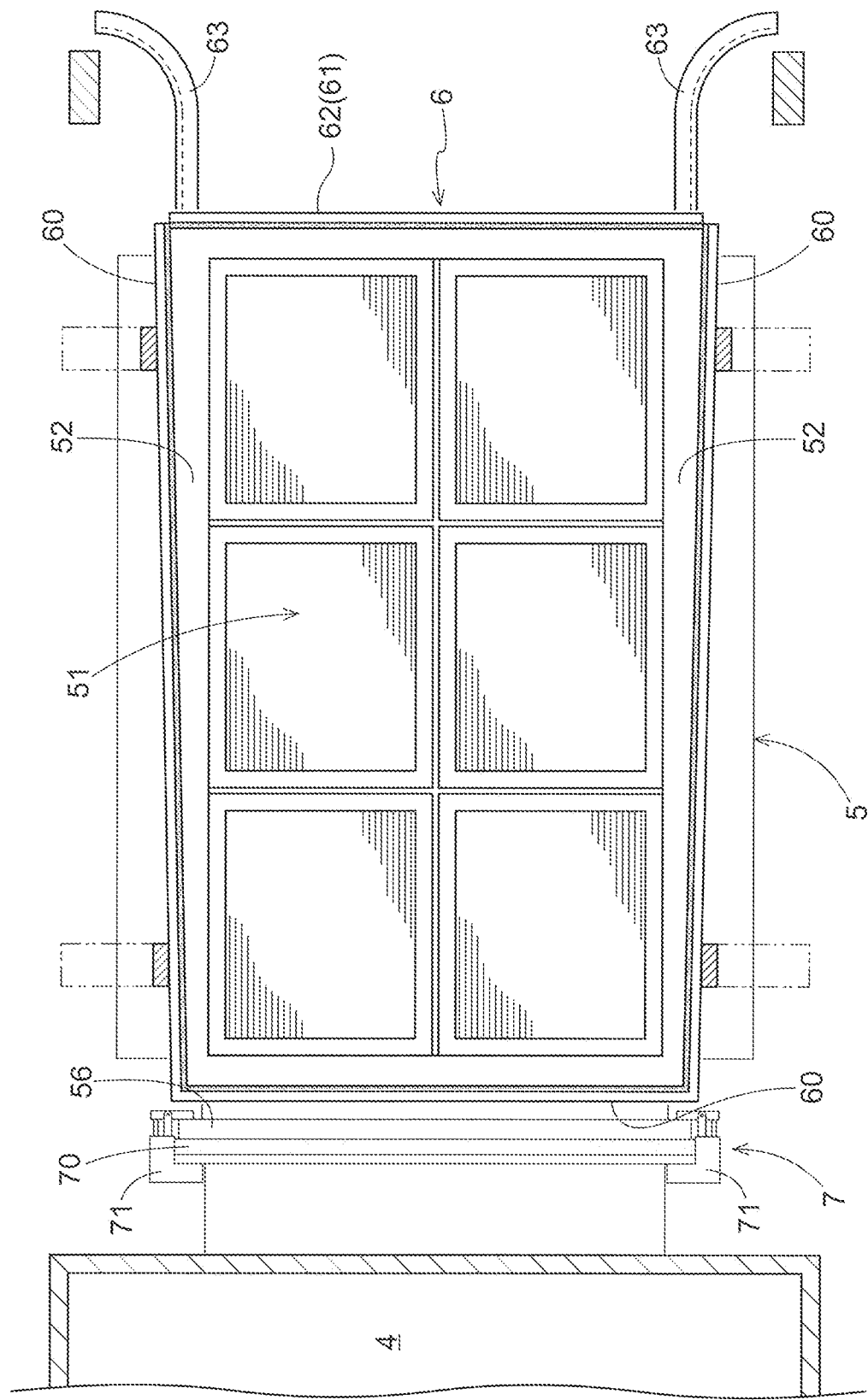
FIG. 2 is a plan view showing a first connection mechanism and a filter unit after setting of the filter unit.
Figure 3:
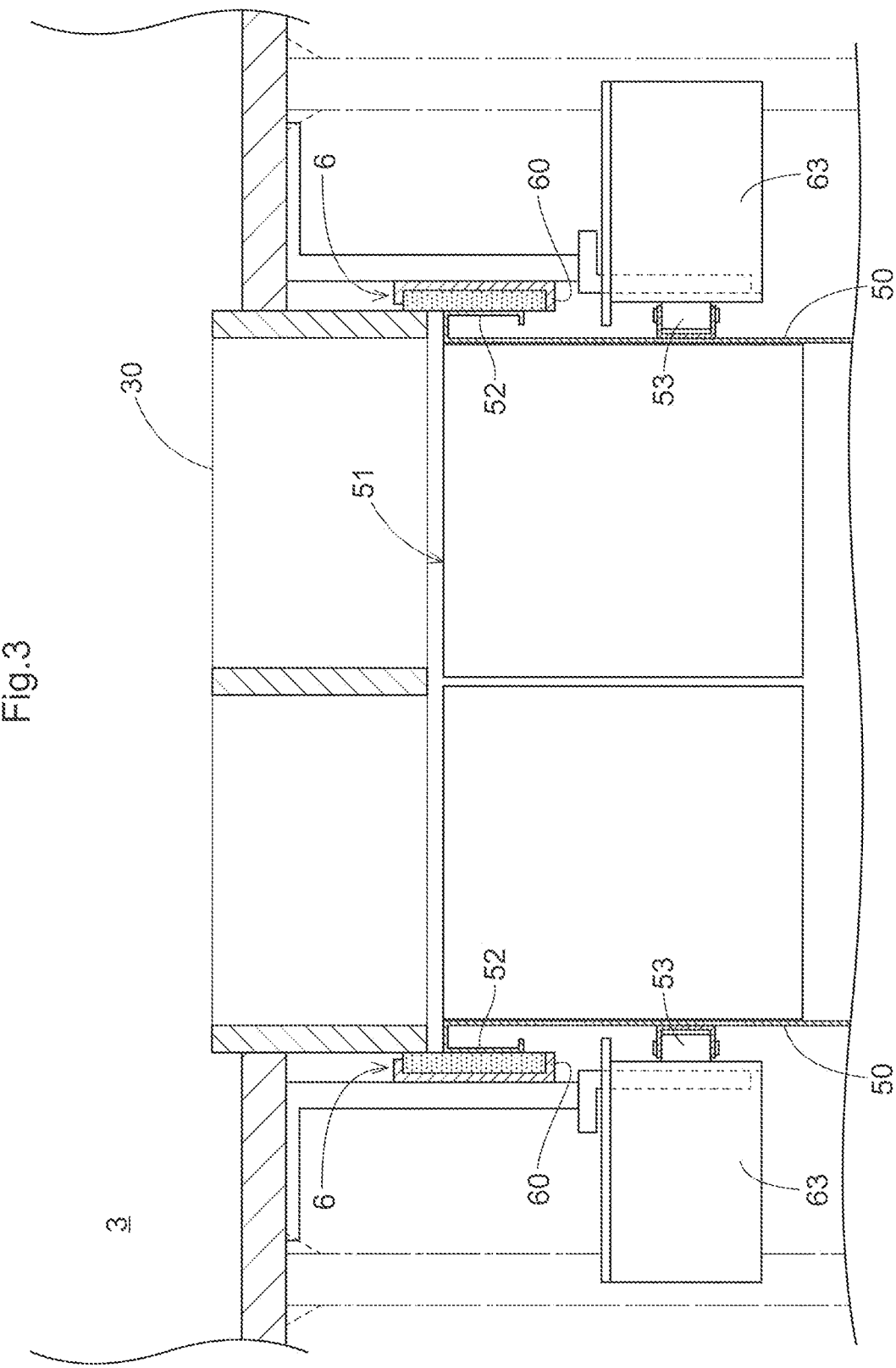
FIG. 3 is a vertical section view showing the first connection mechanism and the filter unit after setting of the filter unit.

As shown in FIGS. 2 through 4, in the upper face portion of the upper housing 50, there is formed an upper face opening portion 51 having an approximately rectangular shape as seen in a plan view. Further, along the entire circumference of the upper end portion of the upper housing 50, there is formed an upper flange portion 52. Further, under the upper flange portion 52 and on the opposed outer side faces which constitute the long sides of the upper housing 50 as seen in the plan view, there are provided roller members 53 along the longitudinal direction.

As shown in FIG. 2 and FIG. 5, one side face which constitutes the short side of the lower housing 54 as seen in a plan view forms a side face opening portion 55 having an approximately rectangular shape as seen in a side view and on an outer face of the lower housing 54, there is provided a lower flange portion 56 in such a manner as to surround the circumferential edge of the side face opening portion 55.

As shown in FIG. 4 and FIG. 5, at the four corners of the bottom face of the lower housing 54, wheels 57 are provided, such that a worker can easily move the filter unit 5.

As shown in FIGS. 2 through 4, the first connection mechanism 6 includes an upper seal portion 60 in the form of a frame plate having an approximately rectangular shape as seen in the plan view. The upper seal portion 60 comes into contact with the entire circumference of the outer face of the upper end portion of the upper housing 50 of the filter unit 5 to prevent leakage of the exhaust gas G.

The upper seal portion 60 includes an introducing portion 61 for introducing the upper end portion of the upper housing 50 of the filter unit 5 in the horizontal direction. At the introducing portion 61, there is provided a partial seal portion 62 in the form of a flat plate and configured as a vertically openable/closable flip-up type. Incidentally, respecting this partial seal portion 62, this is not limited to the vertically openable/closable type, but may be configured to be openable/closable in the left/right direction or to be attachable/detachable to/from the upper seal portion 60.

Figure 6:
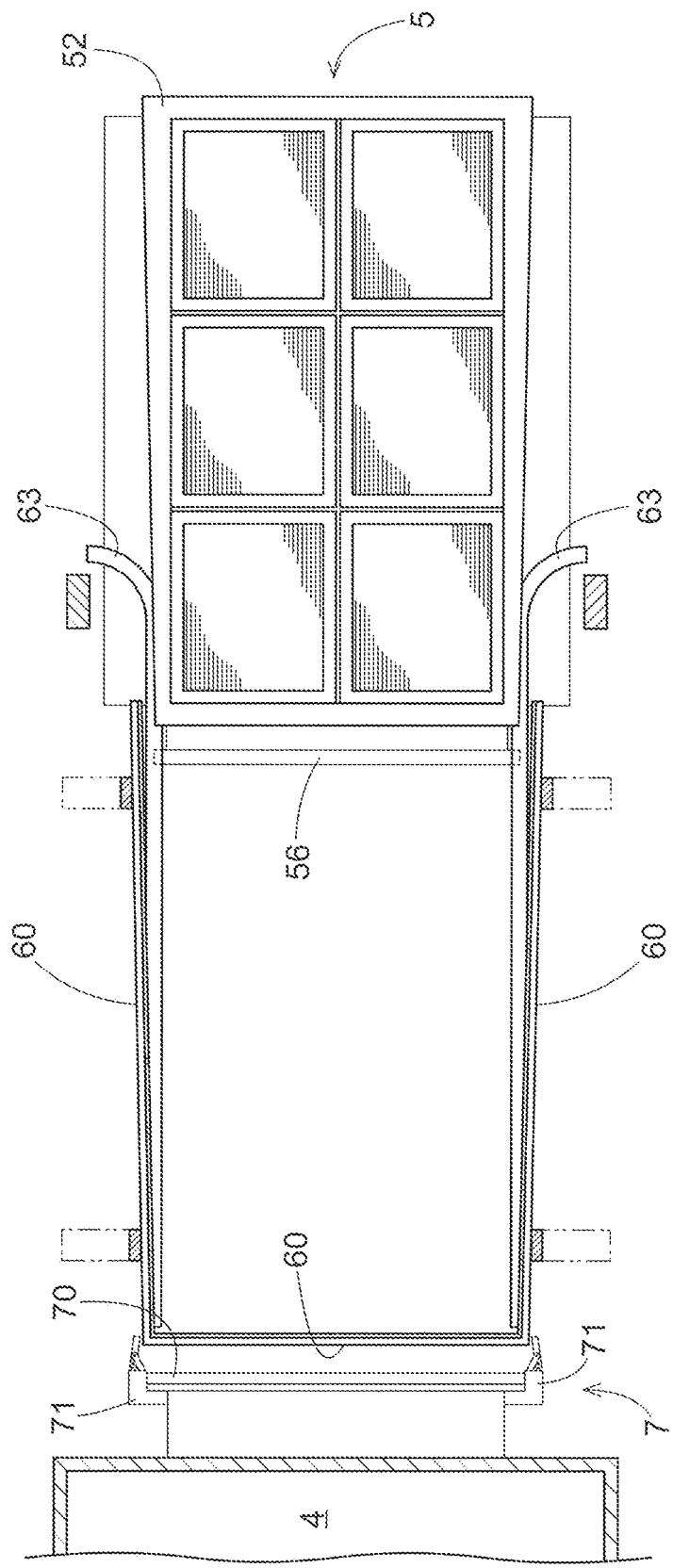
FIG. 6 is a plan view showing the first connection mechanism and the filter unit prior to setting of the filter unit.

As shown in FIG. 2 and FIG. 6, preferably, the planar shape of the upper seal portion 60 is provided as a trapezoidal shape whose width progressively increases on the side of the introducing portion 61 and also the planar shape of the outer face of the upper flange portion 52 of the upper housing 50 of the filter unit 5 is provided as a trapezoidal shape which is in substantial agreement with the planar shape of the upper seal portion 60, such that when the upper flange portion 52 of the upper housing 50 of the filter unit 5 is introduced via the introducing portion 61 to the upper seal portion 60, an outer face of the upper flange portion 50 of the upper housing 50 of the filter unit 5 may be fitted to the inside of the upper seal portion 60. Incidentally, in the instant embodiment, the planar shape of the outer face of the upper flange portion 52 of the upper housing 50 of the filter unit 5 is such trapezoidal shape whose width progressively decreases on the side where the lower flange portion 56 of the lower housing 54 is provided in the direction along the long side of the upper housing 50.

With the above-described arrangement, the lateral width on the side of the introducing portion 61 of the upper seal portion 60 is greater than the lateral width on the initially introduced side of the upper flange portion 52 of the upper housing 50, so fine position alignment is not needed, thus, the upper flange portion 52 of the upper housing 50 of the filter unit 5 can be easily introduced to the upper seal portion 60 of the first connection mechanism 6.

Preferably, the upper seal portion 60 is formed of a material which can resist reduction in its elasticity. Also, preferably, the inner face of the upper seal portion 60 is provided with a slippery treatment by e.g. Teflon (registered trademark) tape or the like, for the purpose of frictional wear reduction and damage prevention which may occur at the time of mounting of the filter unit 5.

Further, as shown in FIGS. 2 through 4, the first connection mechanism 6 includes two guide rails 63 (an example of a "guide member") for guiding movement of the filter unit 5. Each guide rail 63 is provided along the upper seal portion 60 extending in the movement path of the filter unit 5 and under the portion of this upper seal portion 60.

As shown in FIG. 2, the terminal end portion of the guide rail 63 on the side of the introducing portion 61 of the upper rail portion 60 is bent in the form of an arc as seen in the plan view toward the outer side of the movement path of the filter unit 5. The guide rail 63 is adapted to be capable of receiving the roller member 53 of the filter unit 5 at the time of mounting of the filter unit 5 to the painting facility 1.

As shown in FIG. 1 and FIG. 5, the second connection mechanism 7 includes a frame-like lower seal portion 70 having an approximately rectangular shape as seen in a side view and a cylinder 71 (an example of a "coupling member") for coupling the lower flange portion 56 of the lower housing 54 of the filter unit 5. As shown in FIG. 2 and FIG. 5, the cylinders 71 are provided at two opposed ends in the lateral width direction of the lower seal portion 70 and at an approximately mid position in the vertical direction of the lower seal portion 70.

For the time of installing the filter unit 5 in the painting facility 1, an arrangement is provided such that the lower flange portion 56 is pressed against the lower seal portion 70 from the side face, thus maintaining the airtight state of the second connection mechanism 7. And, as both the lower seal portion 70 and the lower flange portion 56 are bound by the cylinders 71, the lower seal portion 70 and the lower flange portion 56 are coupled to each other. Incidentally, respecting the cylinder 71, preferably, this cylinder 71 is configured to be remotely operable by means of e.g. an unillustrated remote control switch provided in the vicinity of the filter unit 5.

The filter unit 5 is configured to be attachable/detachable to/from the painting facility 1. For instance, after removal of the filter unit 5 from the painting facility 1 and replacement of the filter member such as a mist separator used over its usable period by a new one, the filter unit 5 can be installed again in the painting facility 1.

For installing the filter unit 5 in the painting facility 1, firstly, as shown in FIG. 4, the partial seal portion 62 is elevated to clear (open) the introducing portion 61. Further, though not shown, by an operation of a remote control switch or the like, the cylinders 71 will be kept under the opened state.

Next, as shown in FIG. 5 and FIG. 6, the filter unit 5 is pushed in toward the introducing portion 61 along the guide rail 63, with the lower flange portion 56 of the lower housing 54 of the filter unit 5 being oriented toward the exhausting chamber 4.

In the course of the above, since the terminal ends of the guide rails 63 are bent, the filter unit 5 can be readily pushed in along the guide rails 63 without needing fine positional alignment. In addition, as the roller members 53 of the filter unit 5 rotate in contact with the guide rails 63, the filter unit 5 can be moved even more smoothly.

As shown in FIG. 2, as the filter unit 5 is further pushed in toward the introducing portion 61, the upper flange portion 52 of the upper housing 50 of the filter unit 5 is introduced to the upper flange portion 60 from the horizontal direction via the introducing portion 61 and when this reaches the innermost part of the upper seal portion 60, the outer face of the flange portion will be fitted to the inner side of the upper seal portion 60. Simultaneously therewith, the lower flange portion 56 of the lower housing 54 of the filter unit 5 will be joined with the lower seal portion 70 of the second connection mechanism 7.

Lastly, the partial seal portion 62 of the upper seal portion 60 of the first connection mechanism 6 will be lowered to be joined to the upper flange portion 52 of the upper housing 50 of the filter unit 5. Further, the cylinders 71 will be activated by an operation of the remote control switch or the like to sandwich the lower seal portion 70 of the second connection mechanism 7 and the lower flange portion 56 of the lower housing 54 of the filter unit 5, thus coupling the lower seal portion 70 with the lower flange portion 56. With this, installment of the filter unit 5 in the painting facility 1 is completed.

Figure 7:
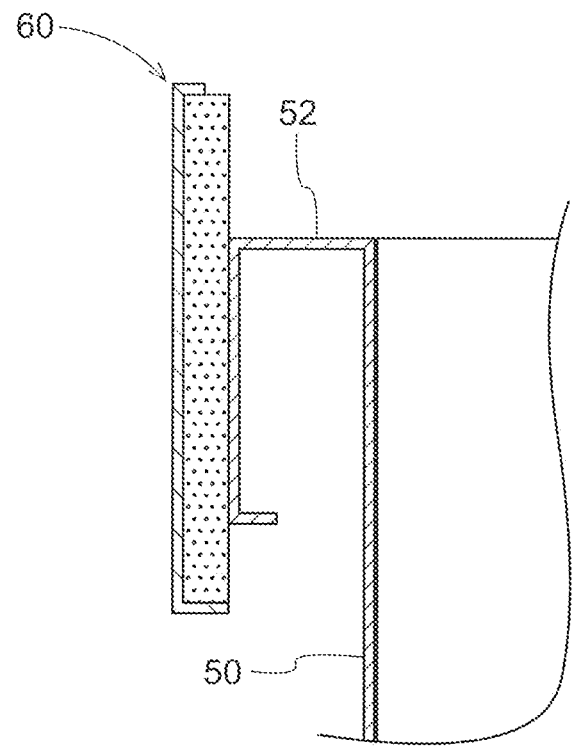
FIG. 7 is a vertical section view showing a contact state between a seal portion and a flange portion of an upper housing of the filter unit.

As shown in FIG. 7, the upper seal portion 60 of the first connection mechanism 6 comes into face-contact with the entire circumference of the outer face of the upper flange portion 52 of the upper housing 50 of the filter unit 5 via respective vertical faces thereof; and further, though not shown, the lower seal portion 70 of the second connection mechanism 7 comes into face-contact with the entire outer face of the lower flange portion 56 of the lower housing 54 of the filter unit 5 via respective vertical faces thereof, whereby the sealability of the filter unit 5 is ensured and leakage of the exhaust gas G can be effectively prevented.

With the above-described inventive configuration, as the upper flange portion 52 of the upper housing 50 of the filter unit 5 is introduced via the introducing portion 61 in the horizontal direction to the upper seal portion 60 for preventing leakage of the exhaust gas G and sealed, the upper face opening portion 51 of the filter unit 5 is placed under a state not in contact with the outer frame of the discharging opening portion 30 of the floor discharging section 3 as shown in FIG. 3.

Namely, unlike the conventional painting facility, there is no need to ensure the sealability by pressing an end face of a paper-made filter member. Therefore, even if the filter unit 5 of this embodiment includes a filter member made of paper material, there will occur no aging embrittlement of this filter member to become unable to maintain the sealability, and there will not occur leakage of the exhaust gas, either.

Further, during operation of the painting facility 1, a negative pressure will develop inside the filter unit 5 due to the action of the suction fan F2. However, since the filter unit 5 has a sturdy construction, there is no risk of e.g. deformation thereof due to such negative pressure and leakage of the exhaust gas G to the outside of the filter unit 5 is prevented also.

Figure 8:
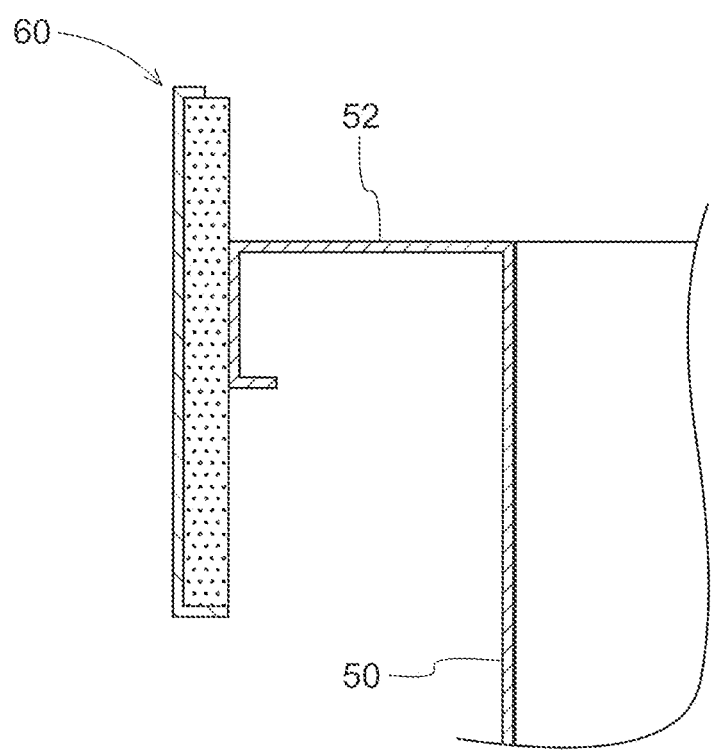
FIG. 8 is a vertical section view showing a contact state between the seal portion and a further mode of flange portion of the upper housing of the filter unit.
Figure 9:
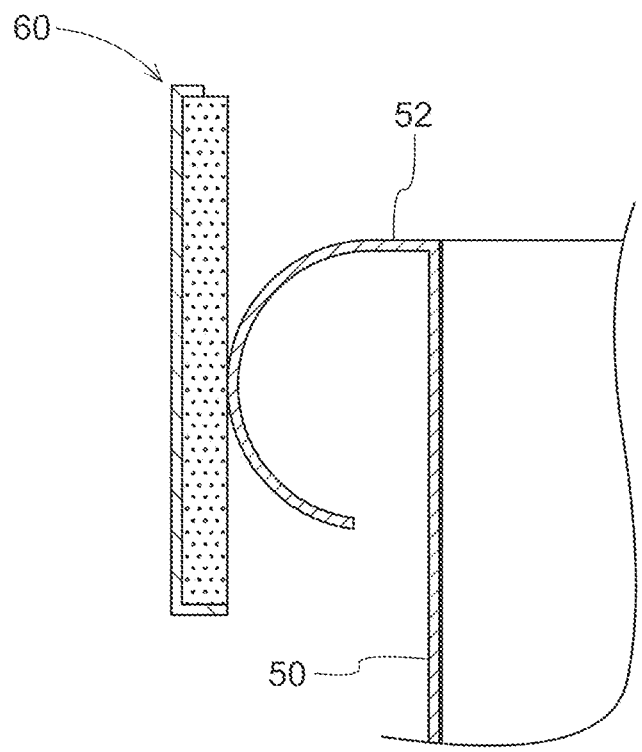
FIG. 9 is a vertical section view showing a further contact state between the seal portion and a further mode of flange portion of the upper housing of the filter unit.

Incidentally, the vertical sectional shape of the upper flange portion 52 of the upper housing 50 of the filter unit 5 is not limited to the vertically elongate substantially rectangular shape shown in FIG. 7. Alternatively, as a form of shape having a smaller contact area, it maybe a laterally elongate substantially rectangular shape shown in FIG. 8 or an arcuate shape shown in FIG. 9. However, in order to make it easy to ensure the sealability, the shape should have as much as possible contact area.

Respecting the size of the vertical width of the upper seal portion 60 of the first connection mechanism 6, preferably, the size should be set large enough with some play to allow the entire upper flange portion 52 of the upper housing 50 of the filter unit 5 to be placed in contact with the upper seal portion 60 in a reliable manner, even if certain unevenness exists on the floor surface on which the filter unit 5 is installed.

Incidentally, as shown in FIG. 1 and FIG. 2, respecting the sizes of the vertical and horizontal widths of the lower seal portion 70 of the second connection mechanism 7, preferably, these sizes should be set large enough with some play to allow the entire lower flange portion 56 of the lower housing 54 of the filter unit 5 to be placed in contact with the lower seal portion 70 in a reliable manner even if certain unevenness exists on the floor surface on which the filter unit 5 is installed.

OTHER EMBODIMENTS

Figure 10:
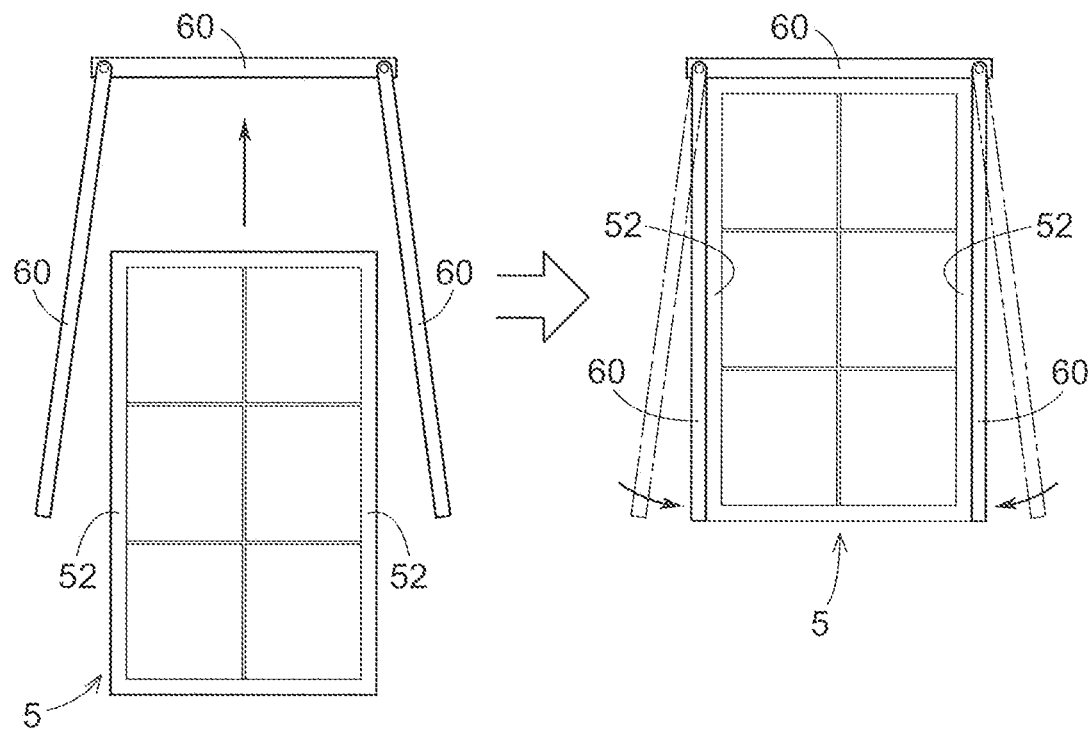
FIG. 10 is a plan view showing a further embodiment of the seal portion.

1. The upper seal portion of the first connection mechanism in the above embodiment has a planar shape which is invariable. However, the invention is not limited thereto, but alternatively, as shown in FIG. 10, by interconnecting three frame-plate members via e.g. a hinge, the size of the width of the introducing portion of the upper seal portion 60 may be rendered variable.

2. In the foregoing embodiment, there was disclosed the arrangement in which the painting facility 1 includes a pair of left and right filter units 5. However, the invention is not limited thereto. The painting facility 1 may include the filter unit 5 only on one of the left and right sides.

3. In the foregoing embodiment, there was disclosed the arrangement in which the first connection mechanism 6 includes the guide rail 63 and the filter unit 5 includes the roller member 53. However, the invention is not limited thereto. The first connection mechanism 6 may include a roller member as the "guide member", so that the filter unit 5 may be guided as the side face of the filter unit 5 comes into contact with this roller member.

Incidentally, although the present invention has been explained as above with reference to the drawings, it is needless to say that the present invention is not limited to the arrangements shown in the drawings and the invention may be embodied with various modifications which do not depart from the essence of the invention.

INDUSTRIAL APPLICABILITY

The painting facility of the present invention may be applied particularly advantageously in the technical field of performing painting/coating of an entire body or various kinds of its constituent parts of e.g. an automobile, a railway car, an airplane, a ship, etc.

DESCRIPTION OF REFERENCE SIGNS

1: painting facility
2: painting chamber
  20: air inlet
  21: dustproof filter
  22: work floor
3: floor discharging section
  30: discharging opening portion (opening portion of floor discharging section)
4: exhausting chamber
  40: exhausting opening portion (opening portion of exhausting chamber)
  41: flow rate adjusting damper
5: filter unit
  50: upper housing
  51: upper face opening portion
  52: upper flange portion (upper end portion of filter unit)
  53: roller member
  54: lower housing
  55: side face opening portion
  56: lower flange portion
  57: wheel
6: first connection mechanism
  60: upper seal portion (seal portion)
  61: introducing portion
  62: partial seal portion
  63: guide rail (example of guide member)
7: second connection mechanism
  70: lower seal portion
  71: cylinder (example of coupling member)
B: body
G: exhaust gas
C: conveyer mechanism
S: spraying device
F1: blower fan
F2: suction fan

The invention claimed is:

1. A painting facility comprising:
a painting chamber where a spray painting work is done on a painting subject;
an exhausting chamber where exhaust gas from the painting chamber is drawn in via a floor discharging section of the painting chamber; and
a filter unit configured to collect uncoated paint mist contained in the exhaust gas;
wherein the painting facility further comprises a first connection mechanism connecting the filter unit to the floor discharging section to establish communication between an opening portion of the floor discharging section and an upper face opening portion of the filter unit and a second connection mechanism connecting the filter unit to the exhausting chamber to establish communication between an opening portion of the exhausting chamber and a side face opening portion of the filter unit,
wherein the filter unit includes an upper flange portion along an entire circumference of an upper end portion of the filter unit,
wherein the first connection mechanism includes a seal portion that comes into contact with an entire circumference of an outer face of the upper flange portion, thus preventing leakage of the exhaust gas; and
wherein the seal portion includes an introducing portion for introducing the upper flange portion to the seal portion from a horizontal direction.

2. The painting facility of claim 1, wherein at the introducing portion, there is provided a partial seal portion which is openable/closable or detachable.

3. The painting facility of claim 1, wherein:
the seal portion has a planar shape which comprises a trapezoidal shape whose width increases progressively toward the side of the introducing portion; and
the outer face of the upper end portion of the filter unit has a planar shape which comprises a trapezoidal shape in substantial agreement with the planar shape of the seal portion, so that upon introduction of the upper end portion of the filter unit to the seal portion in the horizontal direction, the outer face of the upper end portion of the filter unit is fitted to an inner side of the seal portion.

4. The painting facility of claim 1, wherein the width of the introducing portion of the seal portion is variable.

5. The painting facility of claim 1, wherein the first connection mechanism includes a guide member for guiding movement of the filter unit.

6. The painting facility of claim 5, wherein an end portion of the guide member is bent toward the outer side of a movement path of the filter unit.

7. The painting facility of claim 5, wherein the filter unit includes a roller member which rotates in contact with the guide member.

8. The painting facility of claim 1, wherein the second connection mechanism includes a coupling member for connecting the exhausting chamber with the filter unit, the coupling member being remotely operable.

9. The painting facility of claim 2, wherein:
the seal portion has a planar shape which comprises a trapezoidal shape whose width increases progressively toward the side of the introducing portion; and
the outer face of the upper end portion of the filter unit has a planar shape which comprises a trapezoidal shape in substantial agreement with the planar shape of the seal portion, so that upon introduction of the upper end portion of the filter unit to the seal portion in the horizontal direction, the outer face of the upper end portion of the filter unit is fitted to an inner side of the seal portion.

10. The painting facility of claim 2, wherein the width of the introducing portion of the seal portion is variable.

11. The painting facility of claim 2, wherein the first connection mechanism includes a guide member for guiding movement of the filter unit.

12. The painting facility of claim 3, wherein the first connection mechanism includes a guide member for guiding movement of the filter unit.

13. The painting facility of claim 4, wherein the first connection mechanism includes a guide member for guiding movement of the filter unit.

14. The painting facility of claim 6, wherein the filter unit includes a roller member which rotates in contact with the guide member.

15. The painting facility of claim 2, wherein the second connection mechanism includes a coupling member for connecting the exhausting chamber with the filter unit, the coupling member being remotely operable.

16. The painting facility of claim 3, wherein the second connection mechanism includes a coupling member for connecting the exhausting chamber with the filter unit, the coupling member being remotely operable.

17. The painting facility of claim 4, wherein the second connection mechanism includes a coupling member for connecting the exhausting chamber with the filter unit, the coupling member being remotely operable.

18. The painting facility of claim 5, wherein the second connection mechanism includes a coupling member for connecting the exhausting chamber with the filter unit, the coupling member being remotely operable.

19. The painting facility of claim 6, wherein the second connection mechanism includes a coupling member for connecting the exhausting chamber with the filter unit, the coupling member being remotely operable.

20. The painting facility of claim 7, wherein the second connection mechanism includes a coupling member for connecting the exhausting chamber with the filter unit, the coupling member being remotely operable.

* * * * *